(12) United States Patent
Stenseide

(10) Patent No.: US 7,661,718 B2
(45) Date of Patent: Feb. 16, 2010

(54) MEANS FOR FIRE PROTECTION OF PIPE JOINTS AND VALVES IN PIPELINES

(75) Inventor: Magne Stenseide, Kjerrgarden (NO)

(73) Assignee: Dalseide & Floysand Group AS, Bergen (NO)

( * ) Notice: Subject to any disclaimer, the term of this patent is extended or adjusted under 35 U.S.C. 154(b) by 0 days.

(21) Appl. No.: 11/664,552

(22) PCT Filed: Oct. 13, 2005

(86) PCT No.: PCT/NO2005/000381

§ 371 (c)(1),
(2), (4) Date: Feb. 21, 2008

(87) PCT Pub. No.: WO2006/041311

PCT Pub. Date: Apr. 20, 2006

(65) Prior Publication Data

US 2008/0258458 A1    Oct. 23, 2008

(30) Foreign Application Priority Data

Oct. 13, 2004    (NO) ................................. 20044350

(51) Int. Cl.
*F16L 11/12*    (2006.01)
(52) U.S. Cl. ........................................ 285/47; 285/419
(58) Field of Classification Search ................ 285/45, 285/47, 419, 417, 373; 138/162, 163; 52/232
See application file for complete search history.

(56) References Cited

U.S. PATENT DOCUMENTS

| | | | |
|---|---|---|---|
| 3,724,491 A * | 4/1973 | Knudsen et al. ............. | 137/375 |
| 3,771,820 A * | 11/1973 | Hoss et al. ................... | 285/373 |
| RE28,930 E * | 8/1976 | Johnson ...................... | 138/158 |
| 4,046,406 A | 9/1977 | Press et al. | |
| 4,058,328 A * | 11/1977 | Nickerson et al. ............. | 285/45 |
| 4,287,245 A * | 9/1981 | Kikuchi ..................... | 428/34.2 |
| 4,413,683 A * | 11/1983 | Hune ........................ | 169/48 |
| 4,643,461 A * | 2/1987 | Thau et al. .................. | 285/112 |
| 4,788,090 A * | 11/1988 | Marks et al. ................ | 428/34.5 |
| 4,848,043 A * | 7/1989 | Harbeke ....................... | 52/1 |
| 5,103,609 A * | 4/1992 | Thoreson et al. ............. | 52/232 |
| 5,155,957 A * | 10/1992 | Robertson et al. ............. | 52/232 |
| 5,505,497 A * | 4/1996 | Shea et al. ................... | 285/55 |
| 5,887,396 A * | 3/1999 | Thoreson .................... | 52/232 |
| 6,176,052 B1 * | 1/2001 | Takahashi .................... | 52/232 |

FOREIGN PATENT DOCUMENTS

| EP | 0 108 856 A | | 11/1982 |
|---|---|---|---|
| WO | 2008/035976 | * | 3/2008 |

* cited by examiner

*Primary Examiner*—David E Bochna
(74) *Attorney, Agent, or Firm*—Frommer Lawrence & Haug LLP; Ronald R. Santucci

(57) ABSTRACT

Fire protection of pipe joints and valves in a pipeline is provided by two socket halves situated tightly against each other and against the pipe line and surrounding the joint, valve, or such. The socket halves are made from perforated stainless steel plate and have a fire insulation of heat expanding epoxy material on the inside, outside, or on both sides. One of the edges of the socket halves situated against each other comprises an internal cover plate with fire insulation which covers the joint between the two halves and prevents penetration of hot gases into the internal of the socket halves.

4 Claims, 1 Drawing Sheet

MEANS FOR FIRE PROTECTION OF PIPE JOINTS AND VALVES IN PIPELINES

This is a 371 filing of International Patent Application No. PCT/NO2005/000381 filed Oct. 13, 2005 and published on Apr. 20, 2006 under publication number WO 2006/041311 A and claims priority benefits from Norwegian Patent Application No. 20044350 filed Oct. 13, 2004, the disclosure of which is hereby incorporated by reference.

FIELD OF THE INVENTION

The present invention is related to a means for fire protection of pipe joints and valves in pipelines.

BACKGROUND OF THE INVENTION

In case of a fire on or at valves in pipelines or pipe joints it is important that these joints are secured in the best possible way and additionally maintains their function as long as possible during a fire. The pipe joints may be flash connection which by testing of their fire protections should provide documentation for resistance against fire loads such as jet fires and hydrocarbon fires.

SUMMARY OF THE INVENTION

With the means for fire protection according to the present invention as defined by the features stated in the claims, the above mentioned objectives are secured.

BRIEF DESCRIPTION OF THE DRAWINGS

The drawing discloses in FIG. 1 a longitudinal section through a pipe joint with the means for fire protection according to the invention, FIG. 2 discloses in detail in a cross section the connection to the pipe and FIG. 3 discloses in a cross section a detail of the means for fire protection comprising a joint.

DETAILED DESCRIPTION

The means for fire protection according to the present invention comprises two sleeve halves with a perforated stainless steel plate 6 covered by fire isolation 7 and 8 in the shape of heat expanding epoxy products. The fire isolation 7 and 8 may be applied on both sides of the perforated steel plate 6, or only on one of the sides of the steel plate 6.

Figure 1:
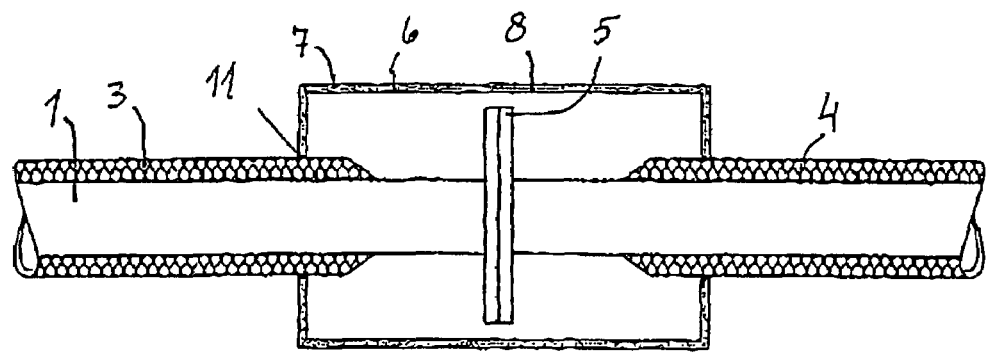
FIG. 1 discloses a flange coupling of two pipes 1 and 2 being connected in a steel case 5. The connection may comprise a valve, flanges or such. Around the pipes 1 and 2 is arranged insulation 3 and 4.
Figure 2:
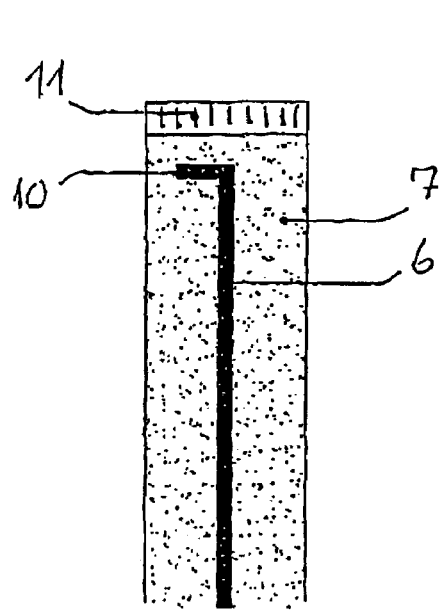
Figure 3:
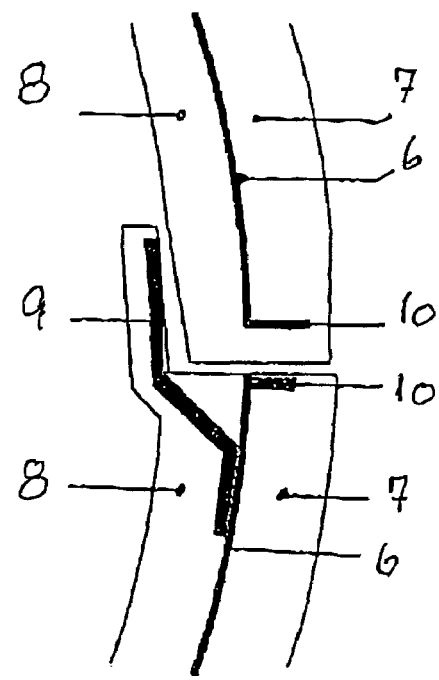

The two socket halves comprise end walls being pressed against the isolation 3 and 4 of the pipes 1 and 2 with a heat swelling gasket 11 as disclosed in FIG. 1. On the inside of one of the socket halves cover plates 9 are secured having fire isolation across the joints. In this way it is avoided that hot gasses penetrate into the inside or underside of the two gasket halves. The joints are enforced by a bent-angle (braking edge) 10 on the steel plates 6.

The two socket halves thereafter are clamped, preferably with not disclosed clamping elements of the type over-a-centre-position, of the type suitcase-locks or such.

By using the heat expanding gaskets, perforated steel armouring and heat expanding epoxy coating in addition to the protection being made completely flexible, a safe fire protection is achieved.

The means for fire protection according to the present invention is especially developed for use on installation which are exposed or extreme climatic conditions, especially large temperature differences and high relative humidity. This is the case for installations both on land and installations offshore.

The invention claimed is:

1. Means for fire protection of pipe joints and valves in a pipeline, comprising two socket halves being situated tightly against each other and against the pipe line and surrounding the joint or valve, wherein the socket halves are made from a perforated stainless steel plate having a heat expanding fire insulation epoxy material on the inside, on the outside or on both sides, and that one of the edges of the socket halves being situated against each other having an internal cover plate with fire insulation across the joint between the two halves and prevent penetration of hot gasses into the internal of the socket halves.

2. Means according to claim 1, wherein the edges of the socket halves having a bent-angle near the edges of the socket halves being situated towards each other.

3. Means according to claim 2, wherein a heat swelling gasket is arranged between an edge of the socket halves being situated against an outer insulation of the pipes and the fire insulation.

4. Means according to claim 1, wherein a heat swelling gasket is arranged between an edge of the socket halves being situated against an outer insulation of the pipes and the fire insulation.

* * * * *